United States Patent [19]

Longo

[11] Patent Number: 4,505,191
[45] Date of Patent: Mar. 19, 1985

[54] DISPENSING UNIT FOR ESPRESSO COFFEE MACHINES

[75] Inventor: Walter G. Longo, Desio, Italy

[73] Assignee: Nuova Faema S.p.A., Milan, Italy

[21] Appl. No.: 598,163

[22] Filed: Apr. 9, 1984

[30] Foreign Application Priority Data

Apr. 14, 1983 [IT] Italy .............................. 20587 A/83

[51] Int. Cl.³ .............................................. A47J 31/24
[52] U.S. Cl. ........................................ 99/300; 99/305
[58] Field of Search ................. 99/279, 295, 300, 301, 99/305, 307, 299; 222/129.2; 426/433

[56] References Cited

U.S. PATENT DOCUMENTS

| 3,347,151 | 10/1967 | Ronalds | 99/295 |
| 4,253,385 | 3/1981 | Illy | 99/295 |
| 4,254,694 | 3/1981 | Illy | 99/295 |
| 4,429,623 | 2/1984 | Illy | 99/295 |

Primary Examiner—Robert W. Jenkins
Attorney, Agent, or Firm—Birch, Stewart, Kolasch & Birch

[57] ABSTRACT

A dispensing unit for espresso coffee machines produces an infusion by "cooking" and optimum exhaustion of the coffee powder. In this dispensing unit, the hot water supply duct to the filter holder is fitted with an air accumulator and is put into communication alternately with the hot water inlet and with the outlet of a three-way solenoid valve.

7 Claims, 1 Drawing Figure

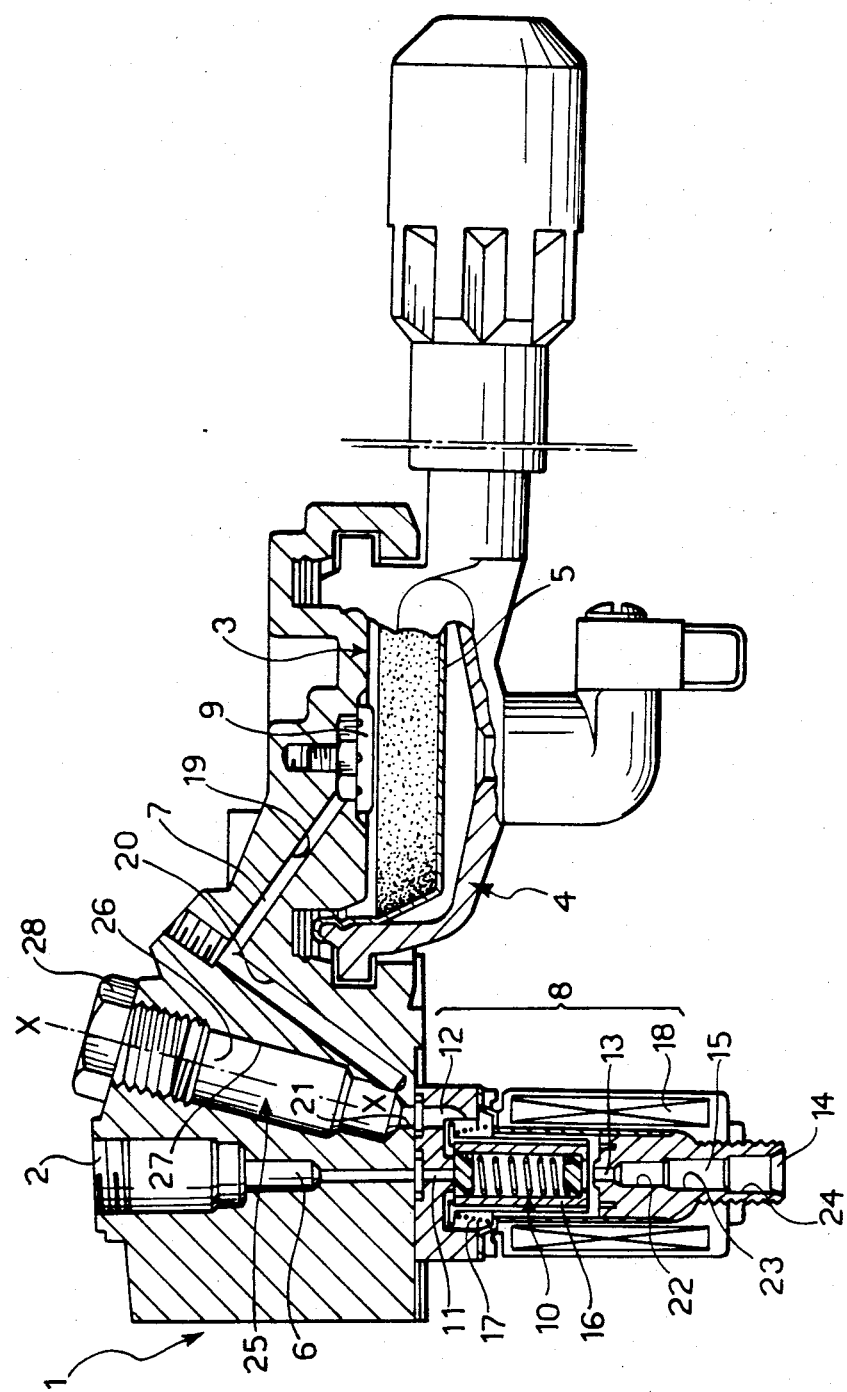

DISPENSING UNIT FOR ESPRESSO COFFEE MACHINES

The present invention concerns a dispensing unit for espresso coffee machines of the type comprising a duct extending between a hot water inlet and a housing in which a removable filter holder is inserted, and on-off hot water valve means located along the channel.

As is already known, espresso coffee is obtained from a dispensing unit by passing a certain metered quantity of water, previously brought up to a predetermined temperature, through a layer of coffee powder pressed into a filter supported by the filter holder which, in turn, is inserted in a housing in the dispensing unit.

As is also known, the hot water which reaches and permeates the layer of coffee powder causes a kind of "cooking" which makes it easier to extract the finer essences of the coffee prepared by roasting.

The known types of dispensing units presently in use, although generally satisfactory and essentially suitable for the intended purpose, present nonetheless a recognized diadvantage relating specifically to the way in which the hot water "cooks" the coffee powder.

In particular, it is found that, at the beginning of the dispensing process, the infusion is weak in finer essences and is somewhat tasteless.

It may also happen that, by the end of the dispensing process, the "cooking" has not been properly completed so that the coffee powder is not utilized to its full extent.

This situation is clearly unsatisfactory for both the consumer and the café owner.

Dispensing units have been suggested in which the hot water feed to the layer of coffee powder is metered by throttling, whereby in practice the water is made to flow through a long and narrow passage.

This has made it possible to obtain improvement in both the quality of the infusion and the utilization of the coffee powder.

The above system, however, entails a certain difficulty in calibrating the throttling device, and there is a tendency for the narrow passage to become clogged with sediments.

This can lead to an undesired lengthening of the time required to obtain the infusion, and may give rise to the opposite drawback of an excessive depletion of the coffee powder, that is to say, the disadvantage of extracting from the coffee powder undesirable substances which adversely affect the taste and aroma of the infusion thus obtained.

The object of the present invention is that of devising a dispensing unit presenting structural and functional features capable of overcoming the abovementioned drawbacks.

In accordance with the present invention a dispensing unit is provided of the type specified, which is characterised by the fact that it includes an air accumulator located along a water duct.

The accumulator is advantageously located downstream of a valve means.

Additional features and advantages of the dispensing unit according to this invention will become evident from the following description of the a preferred embodiment given, by way of non-limiting example, with reference to the appended drawing showing a part-sectional view of a dispensing unit according to the invention.

Referring to the drawing, there is generally indicated 1 a dispensing unit according to the invention, intended for an espresso coffee machine.

The dispensing unit 1 comprises a hot water inlet 2 for connection in an entirely conventional manner to the coffee machine boiler, and also a housing 3 into which is inserted, again conventionally, a removable filter holder 4.

A filter 5 full of coffee powder is placed in the latter, facing the housing 3.

The dispensing unit 1 also includes a hot water supply duct extending between the inlet 2 and the housing 3, and formed of two consecutive duct sections 6 and 7 with interposed valve means, generally indicated 8.

The duct section 7 outlets into the housing 3 via a spout 9.

The valve means 8 consists of a three-way solenoid valve, indicated 10, of which the first way 11 is connected to the inlet 2 via the duct section 6, the second way 12 is connected to the housing 3 via the duct section 7, and the third way 13 is connected to a discharge outlet 14 via a discharge duct 15.

The solenoid valve 10 includes a shutter 16 movably mounted within the valve body, which engages the first way 11 or the third way 13 to shut them off alternately.

More specifically, a spring 17 is fitted within the valve 10 to constantly urge the shutter 16 towards the first way 11, while a solenoid 18 is mounted on the solenoid valve 10 around the shutter 16 in order to move the latter, when energised, towards the third way 13 against the resistance of the spring 17.

The solenoid valve 10, when energised, interconnects the duct sections 6 and 7, and hence the water inlet 2 and the housing 3, while shutting off the discharge duct 15.

The solenoid valve 10, when de-energised, interconnects the duct section 7 and the discharge duct 15, and hence the housing 3 and the discharge outlet 14, while shutting off the duct section 6.

It should be noted that the duct section 7 is formed by bores 19, 20 and 21 of diameters which increase away from the housing 3.

Similarly, the discharge duct 15 is formed by bores 22, 23 and 24 of diameters which increase from the valve way 13 to the outlet 14.

The dispensing device 1 according to the invention also includes an air accumulator, generally indicated 25, situated downstream of the valve means 8 along the hot water supply duct 7.

More specifically, the accumulator 25 has a chamber 26 defined in the dispensing unit by a bore 27 of predetermined diameter and depth, having a subvertical axis X-X and fitted with an airtight closure plug 28.

The chamber 26 is normally full of air which is trapped therein, and at its lower end is in fluid communication with the duct section between the bores 20 and 21.

The operation of the dispensing unit according to the invention is described below with reference to an initial condition shown in the drawing, in which the solenoid valve 10 shuts off the hot water feed ducts 6 and 7 while the housing 3 is in communication with the discharge duct via the solenoid valve itself.

The filter holder 3 is in its engaged position in the dispensing unit 1 and contains a layer of dry coffee powder pressed into filter 5.

To obtain the required espresso coffee, it is sufficient to energise the solenoid valve 10 thereby connecting the inlet 2 with housing 3 and at the same time shutting off the discharge duct 15.

The hot water flows along duct sections 6 and 7 and is sprinkled from the spout 9 on to the layer of coffee powder, permeating through it and beginning to "cook" it.

As the water permeates the coffee powder, the latter expands to retain the water. A progressive increase in pressure is therefore created along the hot water feed duct.

This increase in pressure causes the gradual flooding of chamber 26, with a reduction in the volume of the air pocket present in the chamber itself.

During this stage, there is no passage of water through the layer of coffee powder which is thus able to complete its "cooking".

Meanwhile, the water coming from the boiler builds up within chamber 26.

After reaching the calibrated pressure, the water begins to filter through the layer of coffee powder, producing the optimum infusion with regard to both taste and aroma.

When the predetermined quantity of water has been dispensed, the valve is de-energised.

The duct section 6 is then shut off immediately and, at the same time, duct section 7 is connected to discharge duct 15.

The latter allows venting of the water and steam left in chamber 26, which is forced out by the air compressed therein, and of the water and steam in the ducts 7 and 15, which is drawn in by the same air.

More specifically, the discharge of water and steam is aided by an effusion effect obtained by the progressively enlarged diameters of duct section 7 and discharge duct At this point, it is sufficient to replace the exhausted coffee powder with fresh powder and re-energise the valve 10, in order to bring the dispensing unit 1 back to its initial condition ready to produce another cup of coffee.

By virtue of the air accumulator 25, a delay has been created in the dispensing of the infusion in relation to the supply of hot water to the dispensing unit; during this delay, the layer of coffee powder can thus be subjected to the desired length of "cooking".

Consequently, it is possible to obtain espresso coffee of uniform quality and enriched only with the finer essences of the coffee, achieving at the same time a complete exhaustion of the coffee powder used.

Ultimately, this results in full satisfaction for both the customer and the café owner.

Obviously, in order to meet specific individual requirements, an expert in the art may introduce many modifications and variations to the dispensing unit as described above, all of which fall within the scope of protection of the invention, as defined by the following claims.

I claim:

1. A dispensing unit for espresso coffee machines, of the type having a hot water inlet, a housing, a duct extending between the inlet and the housing, a removable filter holder inserted in the housing, and on-off hot water valve means located along said duct, wherein it duct.

2. A dispensing unit as defined in claim 1, wherein the air accumulator is located downstream of said valve means.

3. A dispensing unit as defined in claim 2, wherein the air accumulator is defined by a chamber in the dispensing unit, said chamber being normally full of air and being in fluid communication at its lower end with said duct downstream of said valve means.

4. A dispensing unit as defined in claim 1, wherein said valve means consist of a three-way solenoid valve with a discharge duct, said valve having a first way connected to said hot water inlet, a second way connected to said housing, and a third way connected to discharge through said discharge duct, whereby said valve connects the housing alternatively so said hot water inlet and said discharge.

5. A dispensing unit as defined in claim 4, wherein said valve comprises a shutter and a spring and an electromagnet which act on said shutter, whereby the latter alternatively shuts off the first and third ways by the action of said spring and said electro-magnet respectively.

6. A dispensing unit as defined in claim 4, wherein said discharge duct has diameters which increase towards the discharge.

7. A dispensing unit as defined in claim 1, wherein the section of the hot water supply duct between the housing and the valve means has a diameter which increases from said housing to said valve means.

* * * * *